(12) United States Patent
Amit et al.

(10) Patent No.: US 10,152,384 B1
(45) Date of Patent: Dec. 11, 2018

(54) LOCATION BASED REPLICATION

(71) Applicant: EMC Corporation, Hopkinton, MA (US)

(72) Inventors: Amir Amit, Ramt Hasharon (IL); Assaf Natanzon, Tel Aviv (IL); Amy Fredj, Nof Ayalon (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 379 days.

(21) Appl. No.: 14/673,531

(22) Filed: Mar. 30, 2015

(51) Int. Cl.
- *G06F 7/00* (2006.01)
- *G06F 17/00* (2006.01)
- *G06F 11/14* (2006.01)
- *G06F 17/30* (2006.01)

(52) U.S. Cl.
CPC ...... *G06F 11/1451* (2013.01); *G06F 11/1464* (2013.01); *G06F 17/30575* (2013.01)

(58) Field of Classification Search
CPC ......... G06F 17/30165; G06F 17/30286; G06F 17/30575; G06F 11/1464; G06F 11/1451
USPC .................................. 707/616, 634, 639, 827
See application file for complete search history.

(56) References Cited

U.S. PATENT DOCUMENTS

| | | | | |
|---|---|---|---|---|
| 5,926,816 A | * | 7/1999 | Bauer | G06F 17/30578 |
| 2012/0271854 A1 | * | 10/2012 | Truong | G06F 21/41 707/785 |
| 2013/0117337 A1 | * | 5/2013 | Dunham | G06F 17/30194 707/827 |
| 2013/0151804 A1 | * | 6/2013 | Alatorre | G06F 17/30165 711/170 |
| 2016/0085461 A1 | * | 3/2016 | Chen | G06F 3/0619 711/162 |

* cited by examiner

*Primary Examiner* — Md I Uddin
(74) *Attorney, Agent, or Firm* — Krishnendu Gupta; Jason Reyes; Robert Kevin Perkins

(57) ABSTRACT

A method, a computer program product, and a system for replicating different projections of data, comprising: examining metadata associated with data on a storage system to determine whether to replicate the data to at least one other storage system; and based on a positive determination, replicating the data to the at least one other storage system.

15 Claims, 13 Drawing Sheets

LOCATION BASED REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventionally, replication is an important feature of most disk-free file storage systems. Typically, replication is a process that occurs in the background from the perspective of an application program, whereby mass storage devices such as disk arrays are backed up to a secondary storage media that may be local to or remote from this primary media.

Protecting data is of paramount importance in modern business. Accordingly, various systems may be employed to replicate selected files to different locations. Unfortunately, current solutions require manual creation of copies with selected files (or projections of the original data), which is not practical in large environments involving Exabyte of storage space to be analyzed and shared.

SUMMARY

A method, a computer program product, and a system for replicating different projections of data, comprising: examining metadata associated with data on a storage system to determine whether to replicate the data to at least one other storage system; and based on a positive determination, replicating the data to the at least one other storage system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
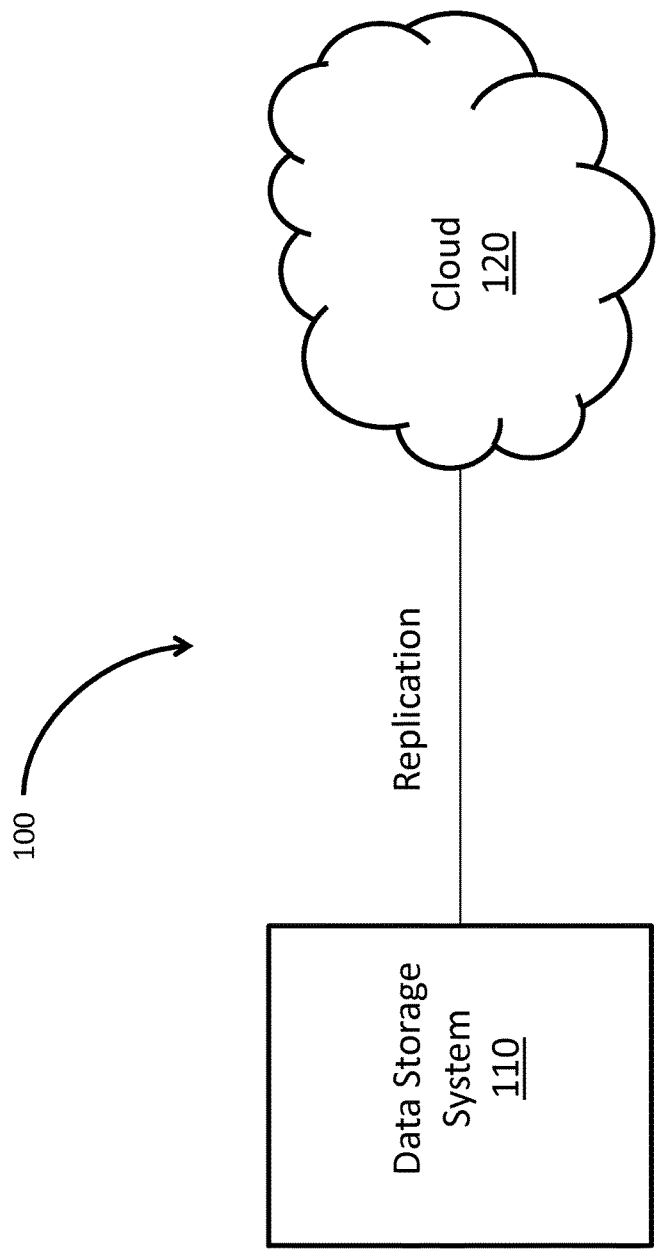
FIG. 1 is a simplified illustration of a block diagram of a data replication system replicating data to a cloud in accordance with an embodiment of present disclosure.

Traditionally, in content management systems and in other contexts access to electronically stored content is restricted, a user, individual, system, application, or process. Generally, a user may be permitted to access a content item if the user is included, individually or by virtue of membership in a group, in an "access control list" (ACL) associated with the content item.

Generally, the rights of a particular user to access a content item may have been determined based on the union of the respective rights (if any) the user has. Typically, rights are governed by virtue of the individual's personal identity, role or group membership. Typically, when an user listed by name or role as having "read" access and delegated "write" access to an item by a "manager group" however not able to utilize the "write" access, a conventional system may grant "write" access to the user.

Conventionally, it has been necessary and/or desired to control access in other and/or additional ways. Traditionally, it may have been desirable to grant "write" access to members of a "manager group" who are also associated with a particular product, division, or geographic region. Typically, additional restrictions include ensuring access is limited to individuals who hold a particular level of security clearance. A typical example may include, enforcing "security labels" such as "secret", "top secret", and/or other security markings or restrictions, including restricting access to users who both have a required security clearance and satisfy additional criteria established to limit access to users believed to have a legitimate "need-to-know". Another conventional example may include criteria indicated by "supplemental markings" such as "US citizens only" or "Western Europe Region only".

Conventionally, data protection systems include data replication, by creating a copy of the organization's production site data on a secondary backup storage system, and updating the backup with changes. Typically, the backup storage system may be situated in the same physical location as the production storage system, or in a physically remote location. Generally, data replication systems may operate either at the application level, at the file system level, database level, or at the data block level.

Traditionally, various systems may be employed to replicate selected files to different locations. Typically, these solutions require manual creation of copies with selected files, or copies of the original data, which may not be practical in large environments involving Exabyte of storage space to be analyzed.

In many embodiments, a method for heterogeneous data replication may take into account replication destination as a factor in the replication process. In some embodiments, original data may be a file system where a single user may have access to specific files. In other embodiments, based on permissions a user of data may have, replication to a remote site (e.g., a cloud) may occur of files to which a user has access. In certain embodiments, an administrator may change file permissions and subsequently allow permissions to a user, and subsequently the file may be replicated where it may not have previously been replicated. In certain embodiments, following a permission change, files with the permission change may be automatically included or excluded from replication based on the permission change. In many embodiments, a user may have access to specific tables in a database, to specific records in a database, or to specific columns/rows in a table. In some embodiments, the tables to which the user has access may be replicated to a remote site. In most embodiments, tables to which a user does not have access may not be replicated to a remote site. In many embodiments, data may be replicated to a storage system's internal backup storage. In further embodiments, changing an ACL may automatically increase or decrease a tables replicated to a remote site.

In many embodiments, data may be replicated to one site or multiple sites. In some embodiments, data may be replicated to one site or to multiple sites based on metadata of data. In certain embodiments, data may include object data, files, directories, databases, tables in a database, columns and rows in a database, and blocks of data. In certain embodiments, metadata of data may contain permissions permitting replication to a single site or to multiple sites. In some embodiments, relevant subsets of data, which may be referred to herein as projections of data, may be replicated to a single location or different locations for further computation by others with access permission to the subsets of data. In certain embodiments, different locations may be untrusted sites, trusted sites, partner sites, or the general public. In most embodiments, permission-based replication may be different types of replication. In certain embodiments, permission-based replication may be file-based replication. In other embodiments, permission-based replication may be block-based replication. In further embodiments, permission-based replication may be object-based replication.

In many embodiments, metadata may characterize data. In certain embodiments, metadata may include a computer host from which data was obtained or otherwise associated with. In other embodiments, metadata may include a timestamp associated with data. In further embodiments, metadata may include a file name or source name with which the data may be associated. In further embodiments, metadata may include a source type of data. In some embodiments, a source type of data may include file type of data.

In some embodiments, different subsets of data or different projections of data may be replicated to different sites. In many embodiments, projections of data may be part of the data or may be derived or computer data. In certain embodiments, derived, computer data may be basic data types, such as Boolean true and false conditions and basic character strings. In some embodiments, computer data may be data processed and stored by a computer system. In other embodiments, subsets of data or projections of the data may be the portion of the data marked as sensitive data, common data, or general data. In some embodiments, sensitive data may be replicated to a private cloud based on metadata. In other embodiments, sensitive data may not be replicated to a public cloud based on metadata. In certain embodiments, common data and general data may be replicated to a public cloud based on metadata. In many embodiments, sensitive data, common data, and general data may be replicated to a private cloud based on metadata. In other embodiments, sensitive data may not be replicated to a cloud based on metadata. In many embodiments, sensitive data, common data, and general data may be encrypted with a different security encryption algorithm. In certain embodiments, different security encryptions algorithms of different strength may be used.

In certain embodiments, data may replicate to partner sites based on permissions or level of access of the data. In many embodiments, certain parts or subsets of data may be replicated to less-trusted sites (such as a public cloud), while other parts or subsets of data may be replicated to more-trusted sites (such as a private cloud).

In many embodiments, there may be cloud-based security levels. In some embodiments, a cloud may have security levels where only data up to a specified security level may be replicated to the cloud.

In certain embodiments, a file system may have access to data based on access permissions. In other embodiments, access permission may be based security levels. In some embodiments, files may be associated with security level number. In many embodiments, files with a metadata security level greater than 2 may be replicated. In certain embodiments, metadata in a file system may limit replication to specific files within the file system. In other embodiments, metadata in a file system may limit replication to a portion of a file in a file system. In many embodiments, metadata in a file system may limit replication based on permissions to certain files in the file system.

In certain embodiments, metadata in a file system may limit replication to specific objects within the file system. In other embodiments, metadata in a file system may limit replication to a portion of an object in a file system. In many embodiments, metadata in a file system may limit replication based on permissions to certain objects in the file system.

In many embodiments, a user may have access to certain tables in a database, and replication may be based on a subset or projection of tables that user has access. In other embodiments, subsets or projections of data may be replicated based on date of tables in the database. In certain embodiments, tables beyond a certain date in a database may not be replicated. In some embodiments, metadata may indicate data older than a year may be replicated. In certain embodiments, metadata in a database system may limit replication to specific tables within the database. In other embodiments, metadata in a database system may limit replication to a portion of a table in a database system (i.e. only some columns of a table and not all table entries). In many embodiments, metadata in a database system may limit replication based on permissions to certain columns in a table. In some embodiments, metadata in a database system may limit replication based on permissions to certain rows in a table in a database system. In other embodiments, replication of projections or subsets of data may be based on ACLs. In some embodiments, the granularity of ACLs may be defined a priori or ad hoc at the file level, at the block level, at the application level, or at the database level.

In certain embodiments, granularity may refer to a level of detail of the ACL. In many embodiments, high granularity of an ACL may be an ACL with a high level of detail, such as permissions of an individual to access data. In other embodiments, low granularity of an ACL may be an ACL with a low level of detail, such as permissions given to a group of individuals or a region.

In some embodiments, granularity of data may refer to a level of detail of the data in data storage systems. In many embodiments, high granularity of data may be data with a high level of detail. In other embodiments, low granularity of data may be data with a low level of detail.

Refer now to the example embodiment of FIG. 1, which is a simplified illustration of a data replication system replicating data to a cloud. In FIG. 1, system 100 includes data storage system 110. System 100 also includes cloud 120. System 100 illustrates data replication to cloud 120 from data storage system 110.

Figure 2:
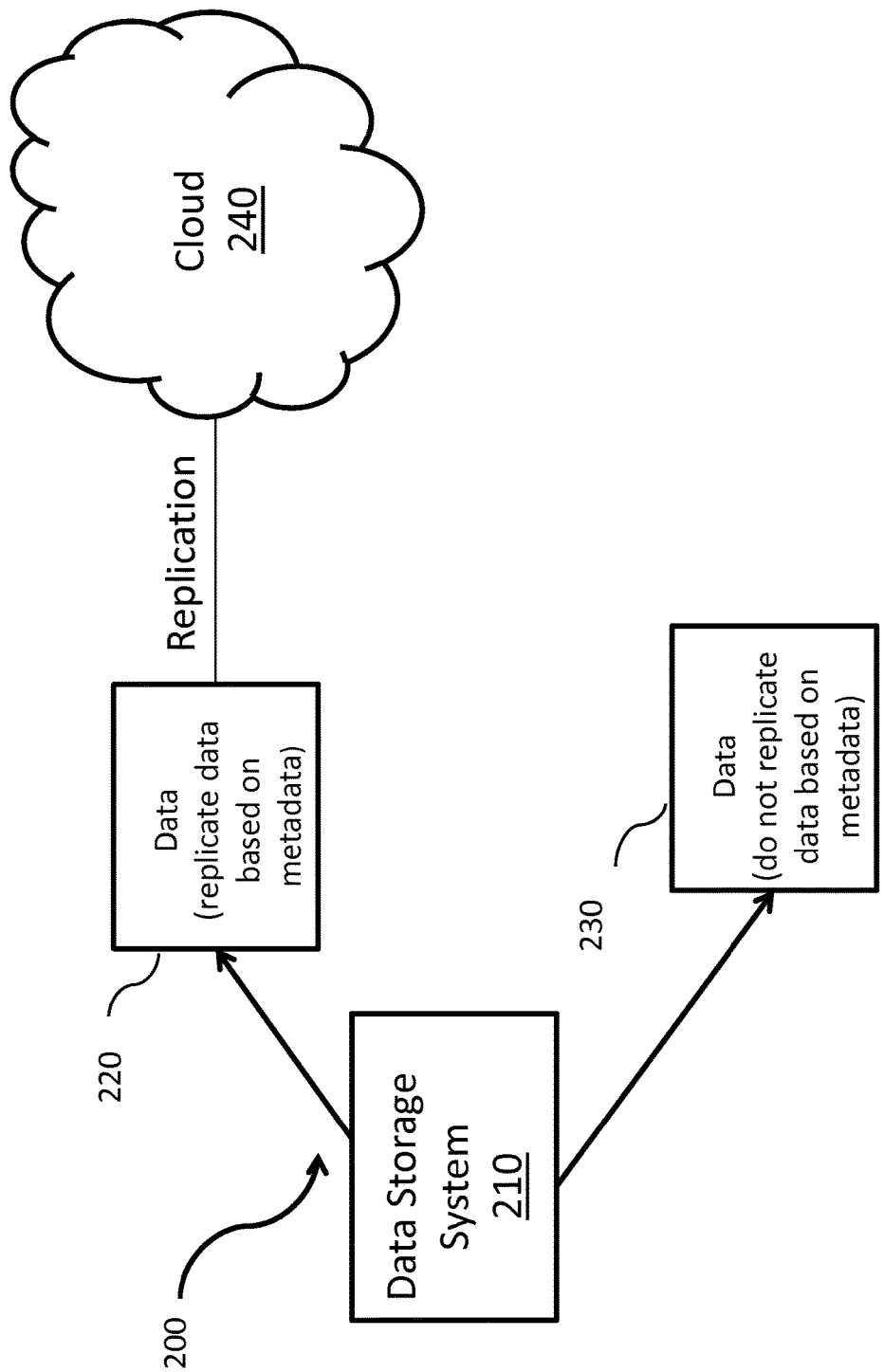
FIG. 2 is a simplified illustration of a block diagram of a data replication system replicating data to a cloud in accordance with an embodiment of present disclosure.

Refer now to the example embodiment of FIG. 2, which illustrates a data replication system replicating data to a cloud based on metadata. In FIG. 2, system 200 includes data storage system 210. System 200 also includes cloud 240. Data storage system 210 contains data 220 and data 230. Data 220 is replicated to cloud 240 based on the data 220 metadata. Data 230 is not replicated to a cloud based on the data 230 metadata.

Figure 3:
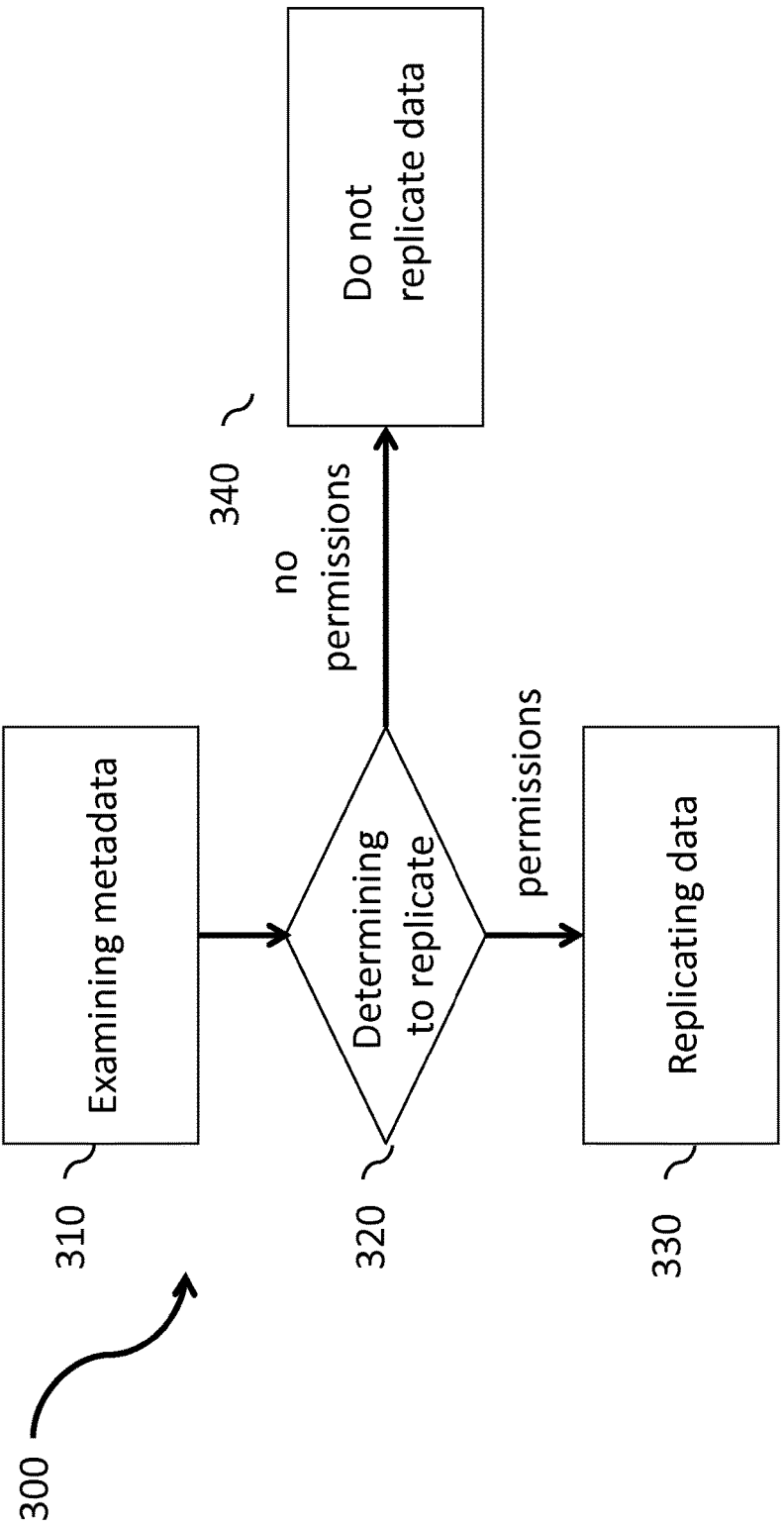
FIG. 3 is a simplified block diagram illustrating a method of replicating data from a storage system to a cloud in accordance with an embodiment of present disclosure.

Refer now to the example embodiments of FIG. 2 and FIG. 3. FIG. 3 is a simplified method of replicating data from a storage system to a cloud. In FIG. 2, data storage system 210, a replication site, examines metadata of data contained in data storage system 210 (step 310). Data storage system 210 determines whether or not to replicate the data contained in the data storage system 210 (step 320). Based on permissions derived by examining metadata, data storage system 210 determines that a projection of original data, specifically data 220, is to be replicated to cloud 240 (step 330). Based on no permissions derived by examining metadata, data storage system 210 determines that a projection of original data, specifically data 230, is not to be replicated (step 340).

Figure 4:
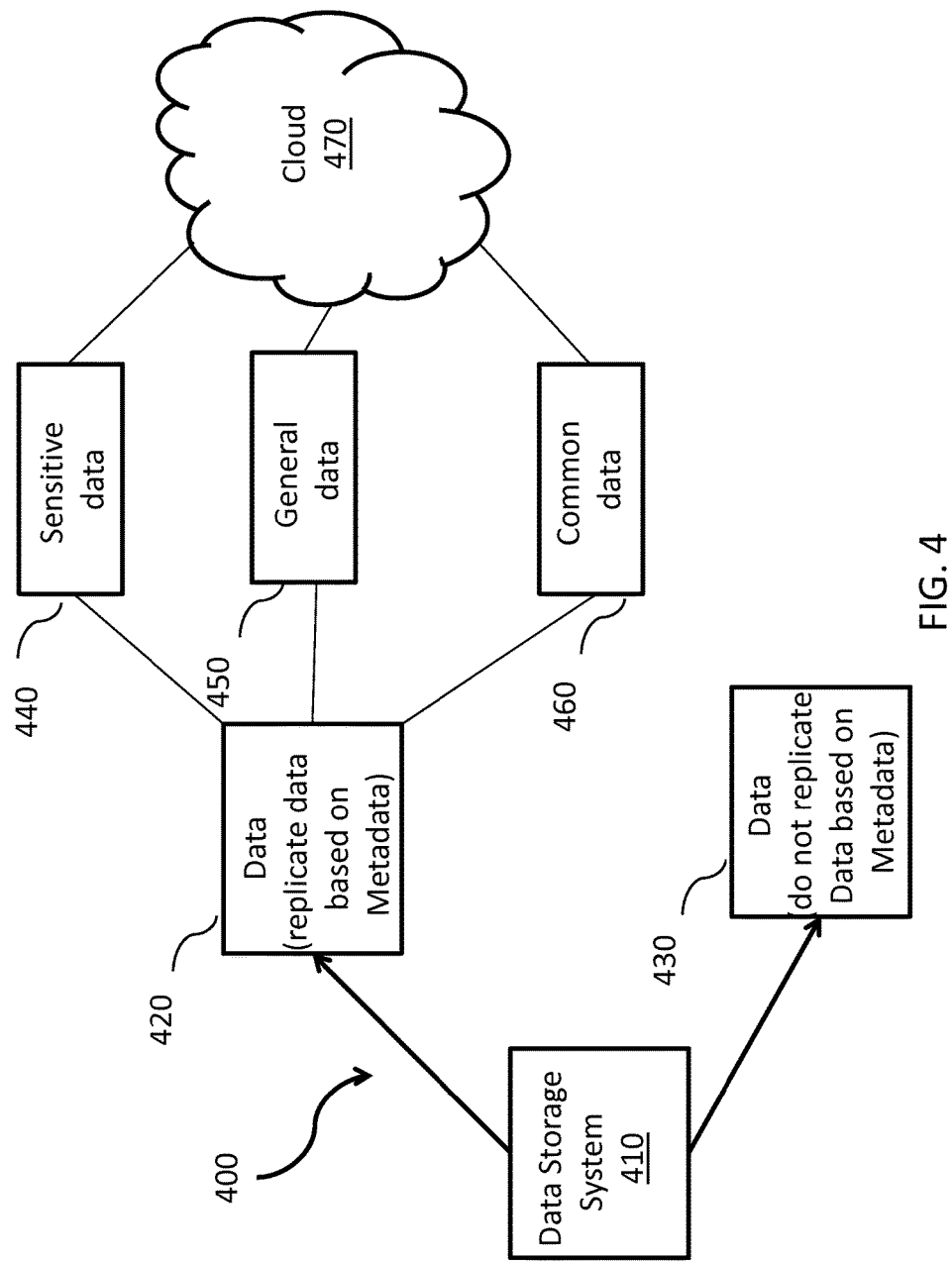
FIG. 4 is a simplified illustration of a block diagram of a data replication system replicating various types of data to a cloud in accordance with an embodiment of present disclosure.

Refer now to the example embodiment of FIG. 4, which illustrates a data replication system replicating data to a cloud based on metadata. In FIG. 4, system 400 includes data storage system 410. System 400 also includes cloud 470. Data storage system 410 contains projections of data comprising data 420 and data 430. Data 420 is comprised of different projections of data 420, which includes sensitive data 440, general data 450, and common data 460. Data 420 is replicated to cloud 470 based on the data 420 metadata. Data 430 is not replicated to a cloud based on the data 430 metadata.

Figure 5:
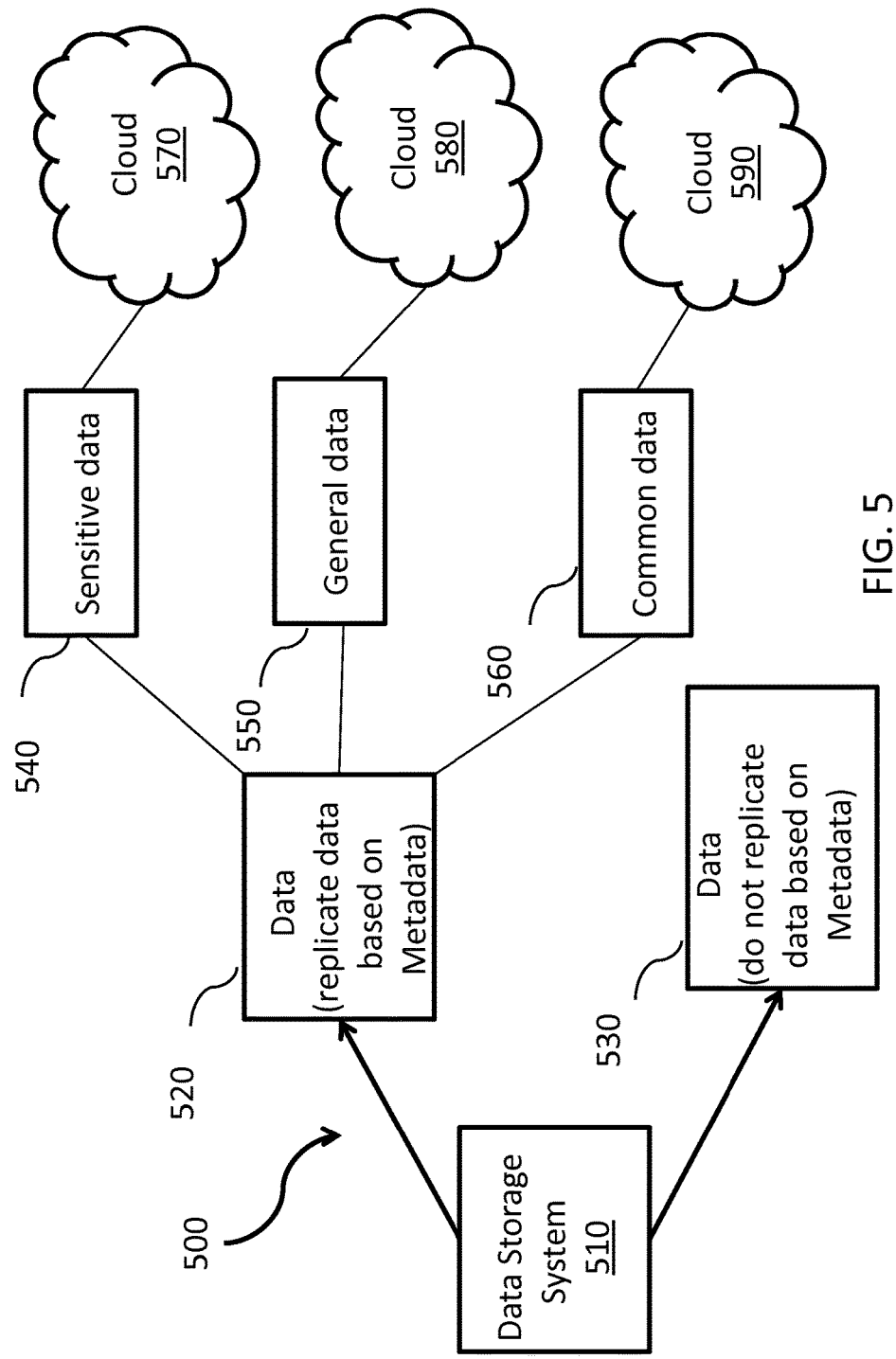
FIG. 5 is a simplified illustration of a block diagram of a data replication system replicating various types of data to multiple clouds in accordance with an embodiment of present disclosure.

Refer now to the example embodiments of FIG. 3 and FIG. 5, which illustrates a data replication system replicating data to different clouds based on data metadata. In FIG. 5, system 500 includes data storage system 510. System 500 also includes cloud 570, cloud 580, and cloud 590. Data storage system 510 contains projections of data comprising data 520 and data 530. Data storage system 510, a replication site, examines metadata of data contained in data storage system 510 (step 310). Based on permissions derived by examining metadata, data storage system 510 determines that different projections of original data, specifically data 520, is to be replicated (step 320). Data 520 is comprised of different projections of data, which includes sensitive data 540, general data 550, and common data 560. Taking replication destination into account, data storage system 510 determines that sensitive data 540 is to be replicated to cloud 570 based on metadata of sensitive data 540 (step 330). Taking replication destination into account, data storage system 510 determines that general data 550 is to be replicated to cloud 580 based on the metadata of general data 550 (step 330). Taking replication destination into account, data storage system 510 determines that common data 560 is to be replicated to cloud 590 based on the metadata of common 560 (step 330). Data 530 is not replicated to a cloud based on the metadata of data 530 (step 340).

Figure 6:
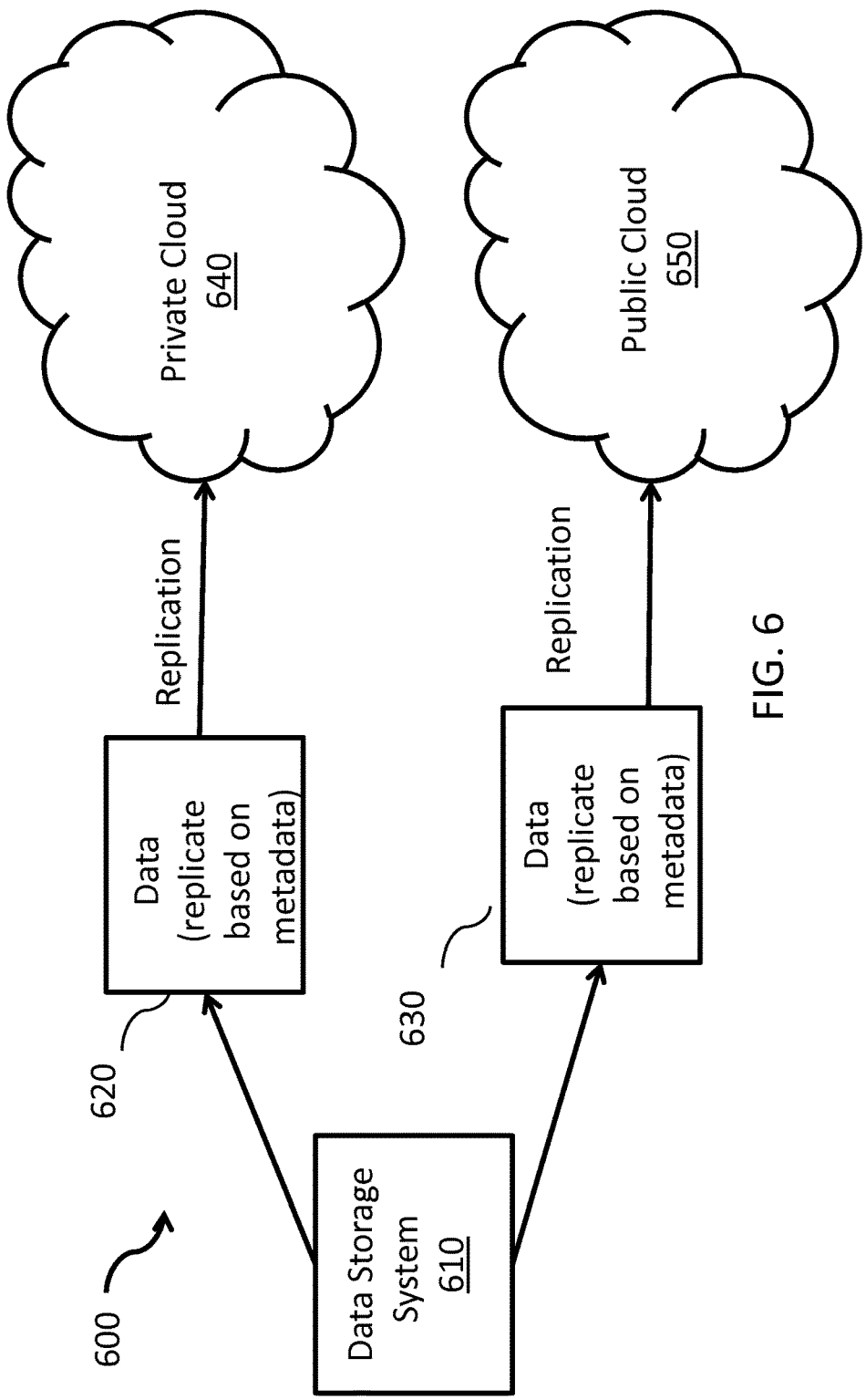
FIG. 6 is a simplified illustration of a block diagram of a data replication system replicating two types of data to multiple clouds in accordance with an embodiment of present disclosure.

Refer now to the example embodiment of FIG. 6, which illustrates a data replication system replicating data to either a private cloud or a public cloud based on metadata. In FIG. 6, system 600 includes data storage system 610. System 600 also includes private cloud 640 and public cloud 650. Data storage system 610 contains projections of data comprising data 620 and data 630. Data 620 is replicated to private cloud 640 based on the metadata from data 620. Data 630 is replicated to public cloud 650 based on the metadata from data 630.

Figure 7:
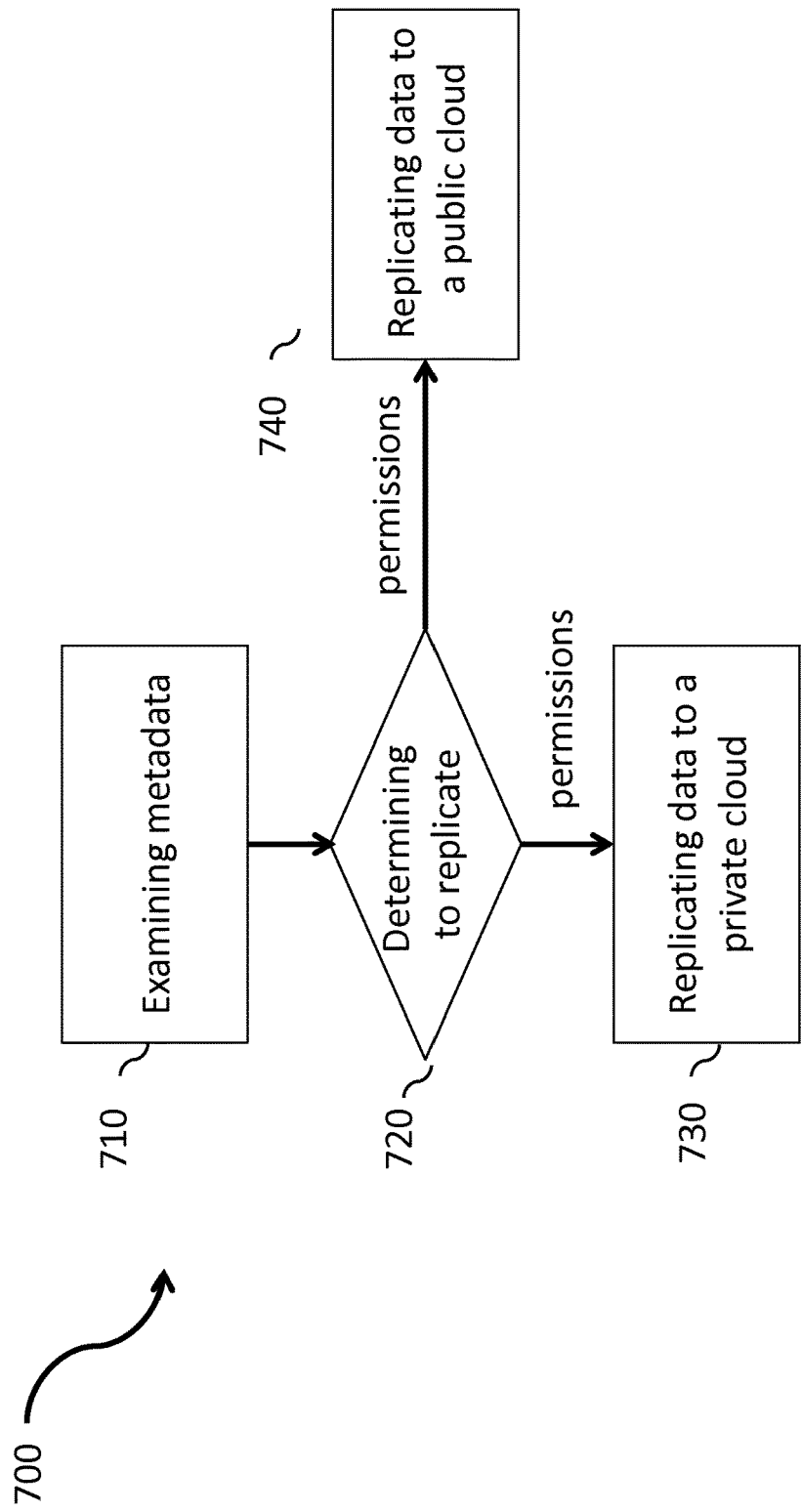
FIG. 7 is a simplified block diagram illustrating a method of replicating data from a storage system to multiple clouds in accordance with an embodiment of present disclosure.

Refer now to the example embodiments of FIG. 6 and FIG. 7. FIG. 7 is a simplified method of replicating data from a data storage system to a cloud. In FIG. 6, data storage system 610, a replication site, examines metadata of data contained in data storage system 610 (step 710). Data storage system 610 determines whether or not to replicate the data contained in the data storage system 610 to either private cloud 640 or to public cloud 650 (step 720). Based on permissions derived by examining metadata, data storage system 610 determines a projection of original data, specifically data 620, is to be replicated to private cloud 640 (step 730). Based on permissions derived by examining metadata, data storage system 610 determines a projection of original data, specifically data 630, is to be replicated to public cloud 650 (step 740).

Figure 8:
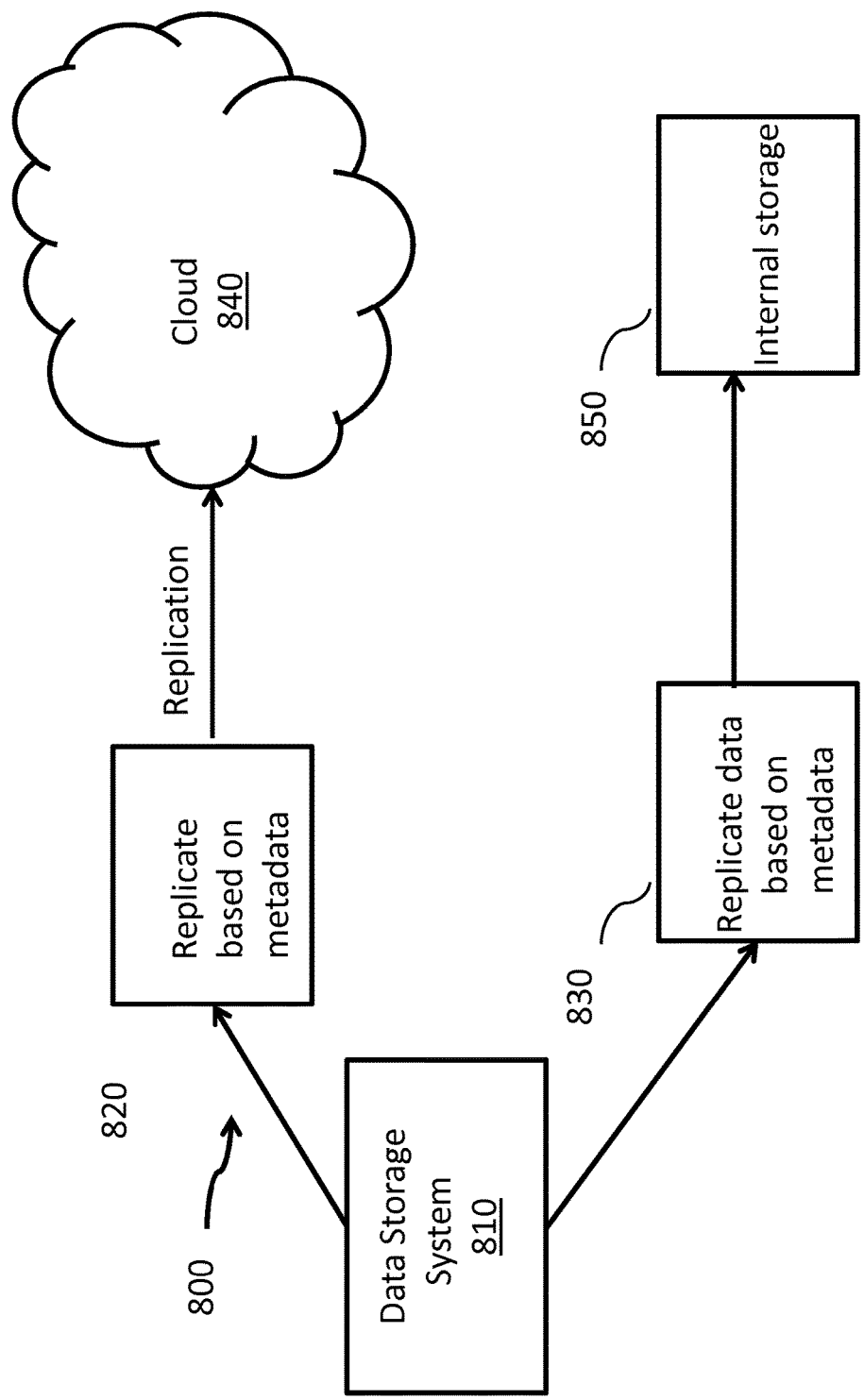
FIG. 8 is a simplified illustration of a block diagram of a data replication system replicating multiple types of data to a cloud or internal storage in accordance with an embodiment of present disclosure.

Refer now to the example embodiment of FIG. 8, which illustrates a data replication system replicating data to either a cloud or internal storage based on metadata. In FIG. 8, system 800 includes data storage system 810. System 800 also includes cloud 840 and internal storage 850. Data storage system 810 contains projections of data that includes data 820 and data 830. Data 820 is replicated to cloud 840 based on metadata of data 820. Data 830 is replicated to internal storage 850 based on metadata of data 830.

Figure 9:
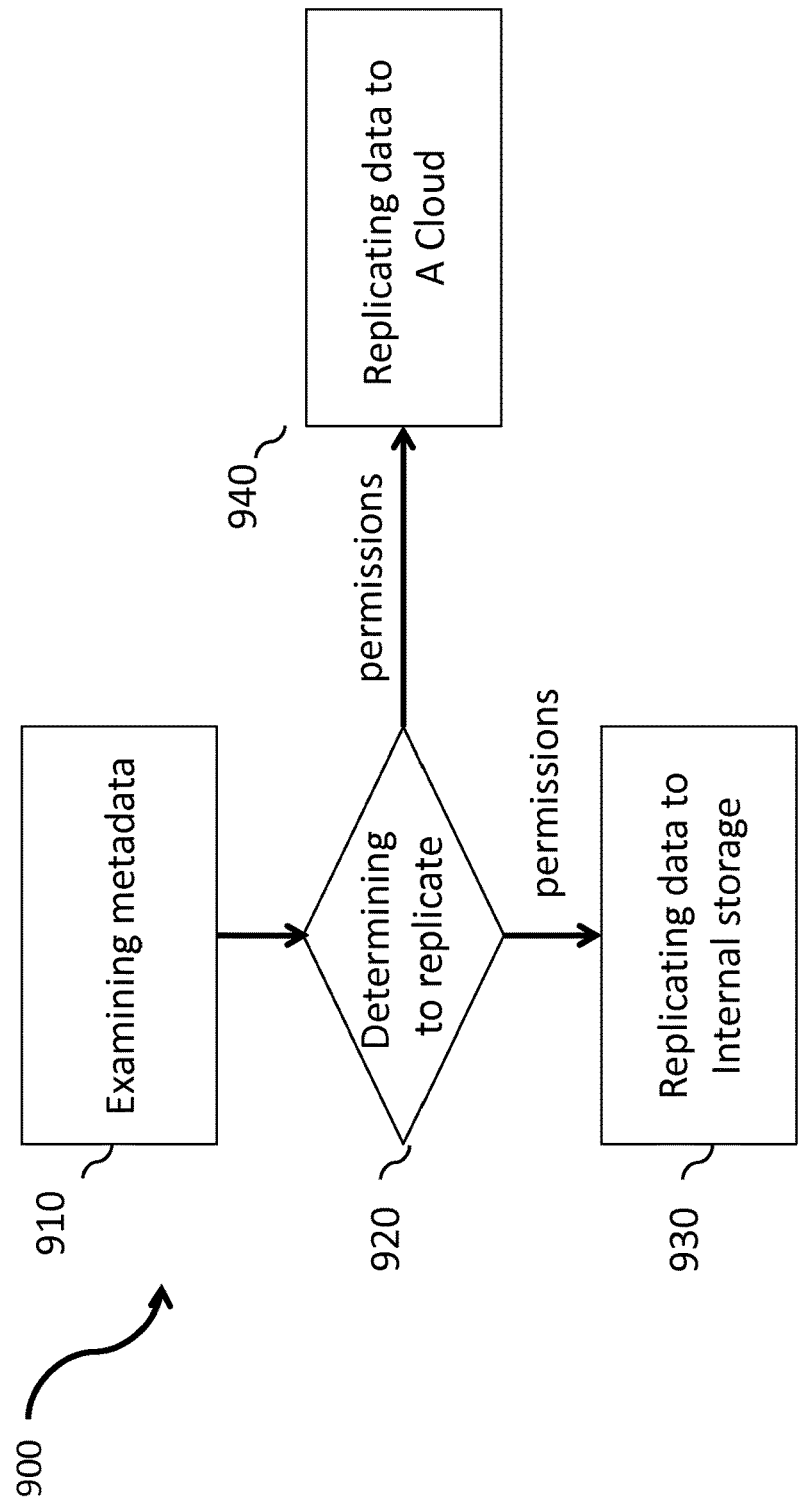
FIG. 9 is a simplified block diagram illustrating a method of replicating multiple types of data from a storage system to a cloud or internal storage in accordance with an embodiment of present disclosure.

Refer now to the example embodiments of FIG. 8 and FIG. 9. FIG. 9 is a simplified method of replicating data from a storage system to either a cloud or internal storage. In FIG. 8, data storage system 810, a replication site, examines metadata of data contained in data storage system 810 (step 910). Data storage system 810 determines whether or not to replicate data contained in data storage system 810 to either cloud 840 or internal storage 850. Data storage system determines a projection of original data, specifically data 830, contained in data storage system 810 is to be replicated to internal storage 850 (step 930). Data storage system 810 determines based on metadata that a projection of original data, specifically data 820, contained in data storage system 810 is to be replicated to cloud 840 (step 940).

Figure 10:
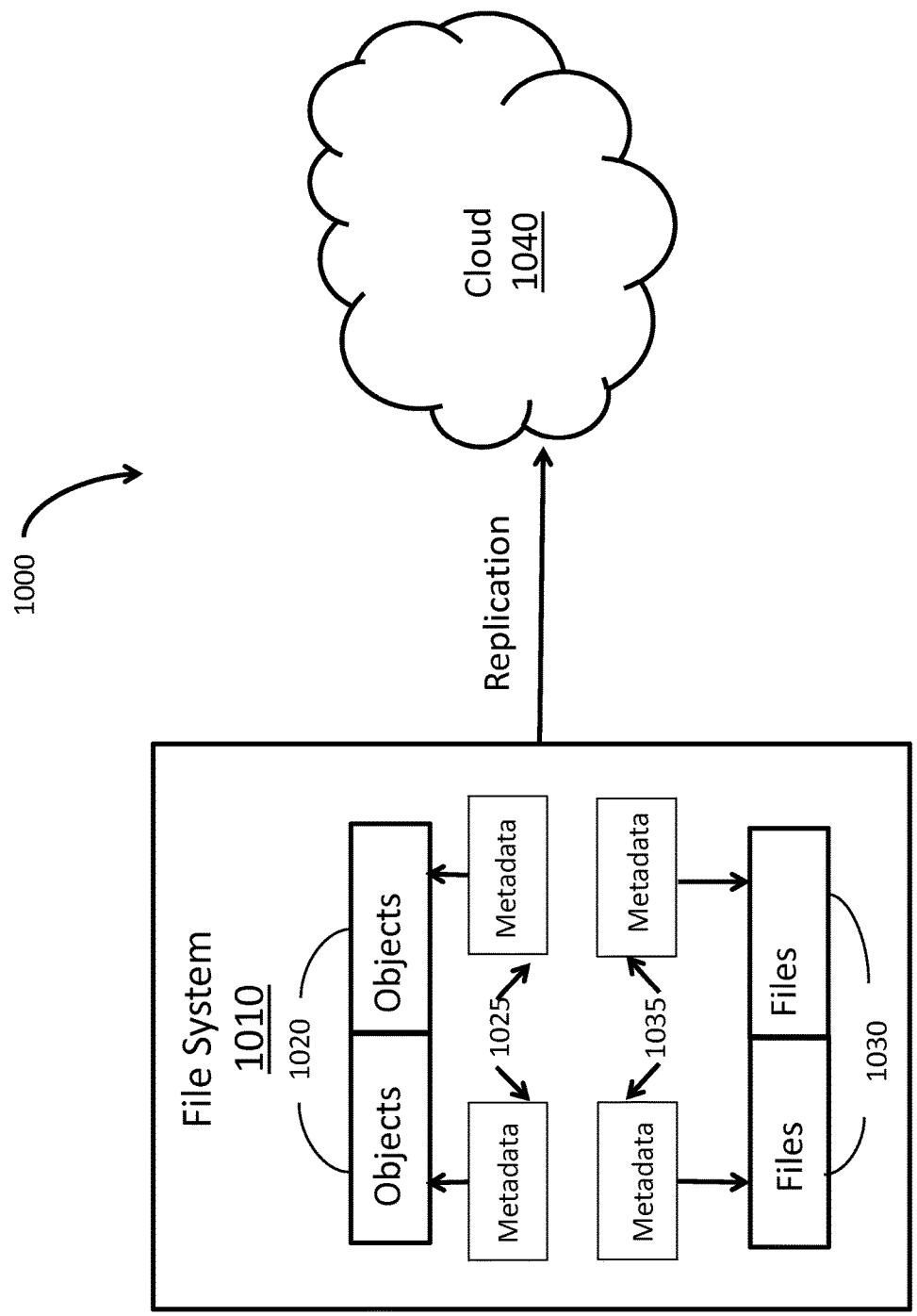
FIG. 10 is a simplified illustration of a block diagram of objects in a file system replicated to a cloud in accordance with an embodiment of present disclosure.

Refer now to the example embodiment of FIG. 10, which is a simplified illustration of a data replication system replicating files to a cloud. In FIG. 10, system 1000 includes file system 1010. File system 1010 includes objects 1020 and metadata 1025 of objects 1020. File system 1010 also includes files 1030 and metadata 1035 of files 1030. System 1000 also includes cloud 1040. System 1000 illustrates data replication to cloud 1040 from file system 1010.

Figure 11:
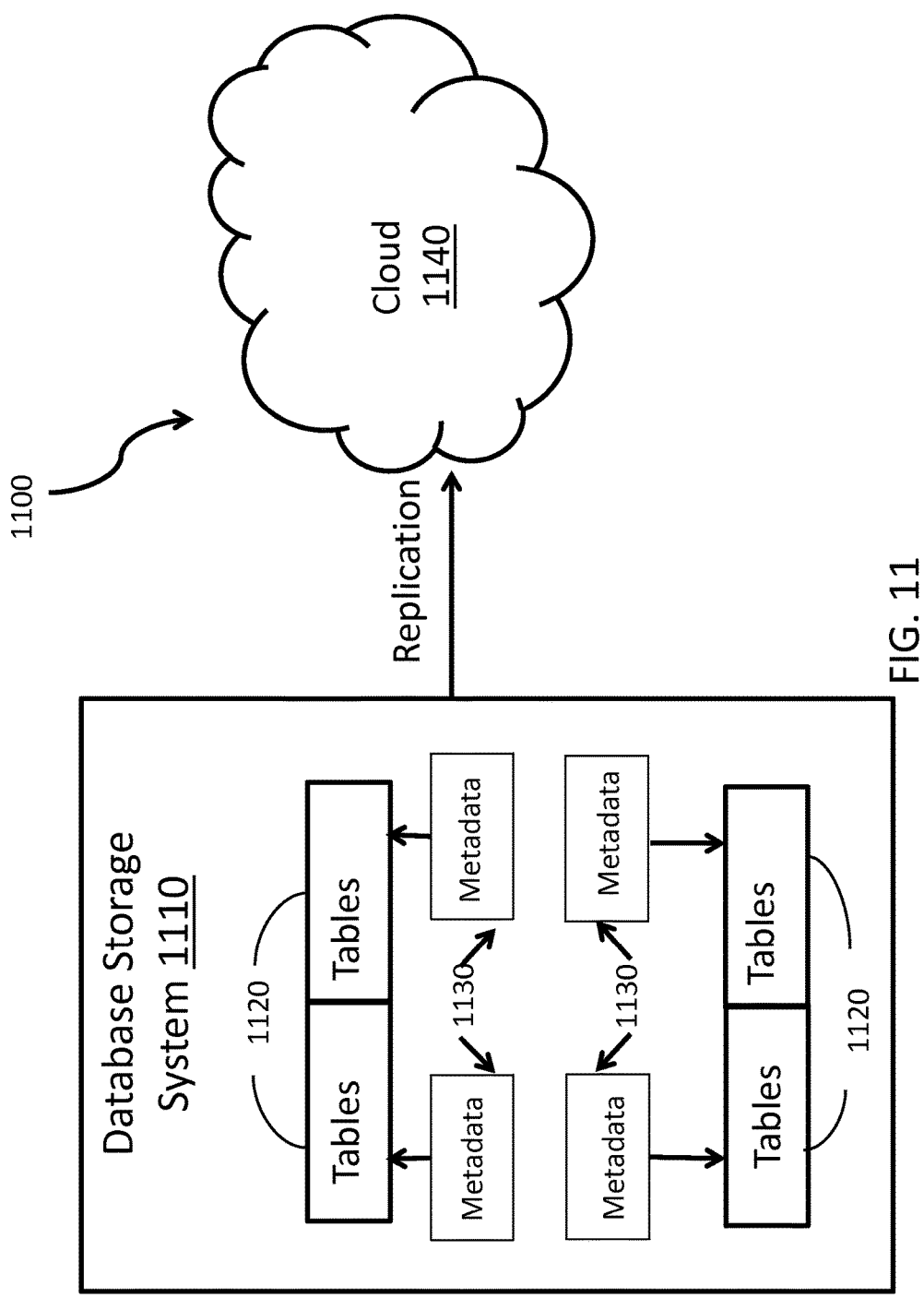
FIG. 11 is a simplified illustration of a block diagram of records in a database system replicated to a cloud in accordance with an embodiment of present disclosure.

Refer now to the example embodiment of FIG. 11, which is a simplified illustration of a data replication system replicating a database to a cloud. In FIG. 11, system 1100 includes database storage system 1110. Database storage system 1110 includes tables 1120 and metadata 1130 of tables 1120. System 1100 also includes cloud 1140. System 1100 illustrates data replication to cloud 1140 from database storage system 1110.

Figure 12:
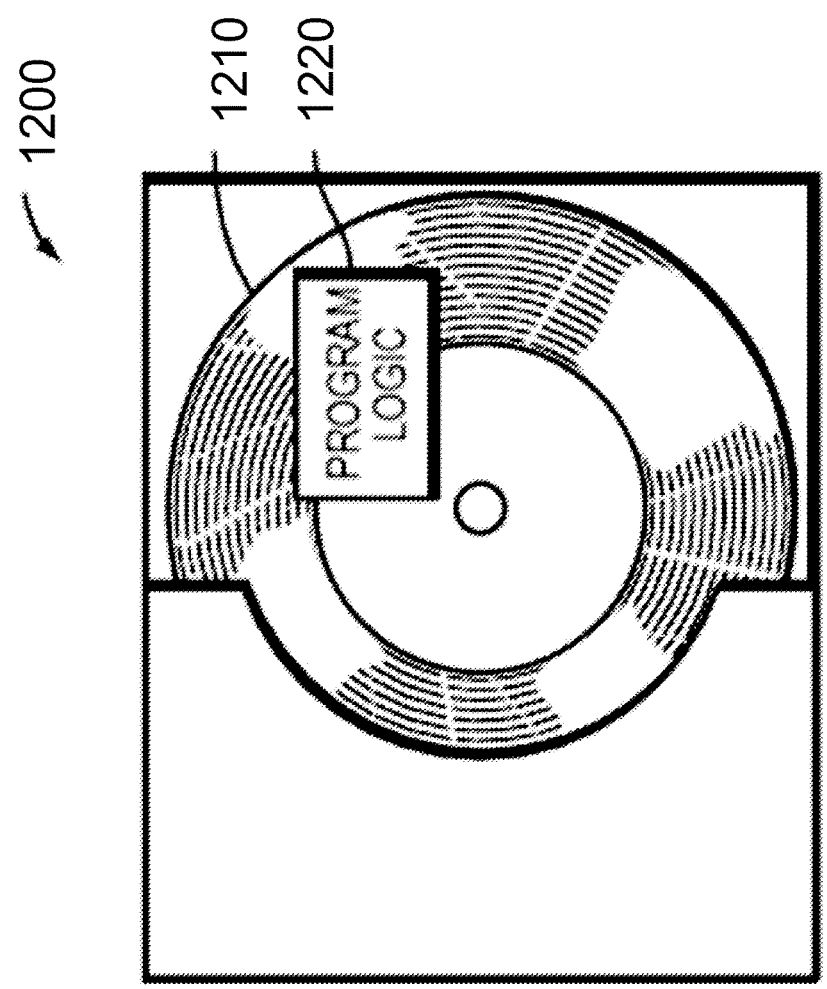
FIG. 12 is a diagram illustrating an example embodiment method of the present disclosure embodied as program code or a program product.

Refer now to the example embodiment of FIG. 12. FIG. 12 shows Program Logic 1220 embodied on a computer-readable medium 1210 as shown, and wherein the Program Logic 1220 is encoded in computer-executable code configured for carrying out the measurement and analysis process of this invention and thereby forming a Computer Program Product 1200.

The logic for carrying out the method may be embodied as part of the aforementioned system, which is useful for carrying out a method described with reference to embodiments shown in, for example, FIG. 3, FIG. 7, and FIG. 9. For purposes of illustrating the present invention, the invention is described as embodied in a specific configuration and using special logical arrangements, but one skilled in the art will appreciate that the device is not limited to the specific configuration but rather only by the claims included with this specification.

Figure 13:
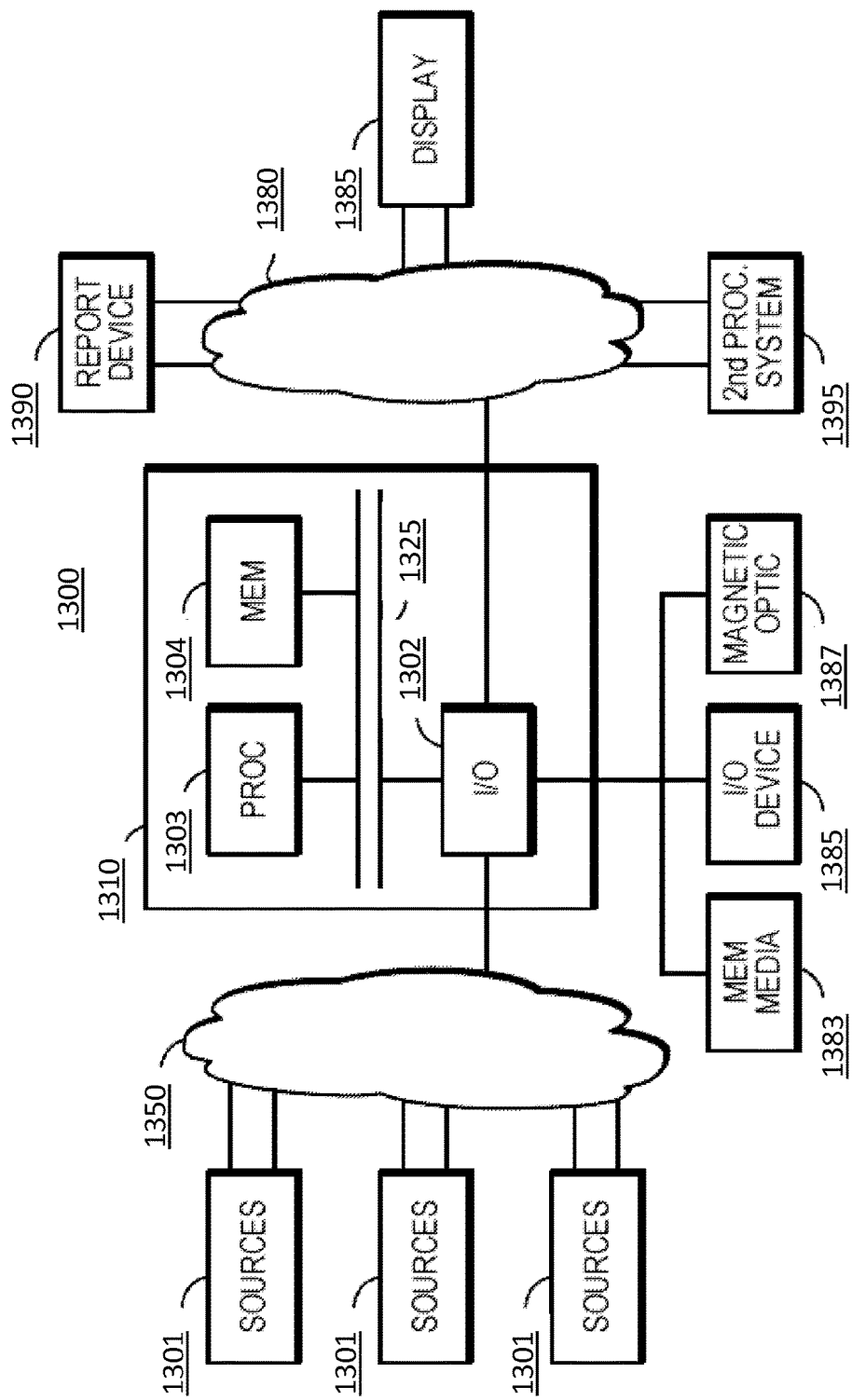
FIG. 13 is an example of an embodiment of an apparatus that may utilize the techniques described herein, in accordance with an embodiment of the present disclosure.

Refer now to the example embodiment of FIG. 13. The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. A processor may be a physical processor or one or a virtual processor. In certain embodiments, a virtual processor may correspond to one or more or parts of one or more physical processors.

The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed:

1. A method for replicating data stored on a storage system, comprising:

replicating, using a computer processor on a storage system, different projections of data to a public cloud and a private cloud, the replicating including at least one of file-based replication, block-based replication, and object-based replication, the data being associated with one or more security levels, such that only data having up to a predetermined security level is replicated to the public cloud, the replicating comprising:

examining, using the computer processor, metadata associated with data on the storage system to determine whether to replicate the data to at least one of the public cloud and the private cloud, the data including a table of original data, and the metadata including: (i) permissions that define user access to specific rows or columns of the table and (ii) computer host information associated with the data; and based on a positive determination to replicate the data, replicating, using the computer processor, at least some of the data to at least one of the public cloud and the private cloud, the replicating comprising replicating no more than a portion of the table to one of the public cloud and the private cloud, the portion of the table being selected for replication based on the permissions that define user access to specific rows or columns of the table, wherein the data comprises general data, sensitive data and common data, at least one of the general data, the sensitive data, and the common data being encrypted using a different strength encryption than another one of the general data, the sensitive data, and the common data, wherein the sensitive data is replicated to the private cloud based on the metadata, and wherein the common data and the general data are replicated to the public cloud based on the metadata, wherein examining metadata associated with the data includes examining the permissions that define user access to specific rows or columns of the table, the permissions being specified in an Access Control List (ACL) and wherein changing the ACL automatically changes data that is stored in at least one of the private cloud and the public cloud.

2. The method of claim 1, wherein at least one of the private cloud and the public cloud is part of a big data storage cloud.

3. The method of claim 1, wherein the metadata associated with the data on the storage system indicates an age of the data.

4. The method of claim 1, wherein each of the public cloud and the private cloud is associated with a respective security level, and the replication of the data to the public cloud and the private cloud is performed based on the respective security levels of the public cloud and the private cloud.

5. The method of claim 1, wherein at least one of the public cloud and the private cloud is selected to receive the portion of the table based on the metadata.

6. A non-transitory computer-readable storage medium encoded with computer-executable program code which when executed by one or more processors, causes the one or more processors to:

replicate different projections of data stored on a storage system to a public cloud and a private cloud, the replication including at least one of file-based replication, block-based replication, and object-based replication, the data being associated with one or more security levels, such that only data having up to a predetermined security level is replicated to the public cloud, the replicating comprising:

examining metadata associated with data on the storage system to determine whether to replicate the data to at least one of the public cloud and the private cloud, the data including a table of original data, and the metadata including: (i) permissions that define user access to specific rows or columns of the table and (ii) computer host information associated with the data; and based on a positive determination to replicate the data, replicating at least some of the data to the at least one of the public cloud and the private cloud, the replicating comprising replicating no more than a portion of the table to one of the public cloud and the private cloud, the portion of the table being selected for replication based on the permissions that define user access to specific rows or columns of the table, wherein the data comprises general data, sensitive data and common data, at least one of the general data, the sensitive data, and the common data being encrypted using a different strength encryption than another one of the general data, the sensitive data, and the common data, wherein the sensitive data is replicated to the private cloud based on the metadata, and wherein the common data and the general data are replicated to the public cloud based on the metadata, wherein examining metadata associated with the data includes examining the permissions that define user access to specific rows or columns of the table, the permissions being specified in an Access Control List (ACL) and wherein changing the ACL automatically changes data that is stored in at least one of the private cloud and the public cloud.

7. The non-transitory computer-readable storage medium of claim 6, wherein at least one of the private cloud and the public cloud is part of a big data storage cloud.

8. The non-transitory computer-readable storage medium of claim 7, wherein the metadata associated with the data on the storage system indicates an age of the data.

9. The non-transitory computer-readable storage medium of claim 6, each of the public cloud and the private cloud is associated with a respective security level, and the replication of the data to the public cloud and the private cloud is performed based on the respective security levels of the public cloud and the private cloud.

10. The non-transitory computer-readable storage medium of claim 6, wherein at least one of the public cloud and the private cloud is associated with a respective security level, and the replication of the data to the public cloud and the private cloud is performed based on the respective security levels of the public cloud and the private cloud.

11. A system for replicating different projections of data, the system comprising:

an analytics platform;

a storage system;

a computer having a memory and one or more processors configured to replicate different projections of data to a public cloud and a private cloud, the replicating including at least one of file-based replication, block-based replication, and object-based replication, the data being associated with one or more security levels, such that only data having up to a predetermined security level is replicated to the public cloud, the replicating comprising:

examining metadata associated with data on the storage system to determine whether to replicate the data to at least one of the public cloud and the private cloud, the data including a table of original data, and the metadata including: (i) permissions that define user access to specific rows or columns of the table and (ii) computer host information associated with the data; and based on a positive determination to replicate the data, replicating at least some of the data to the at least one of the public cloud and the private cloud, the replicating comprising replicating no more than a portion of the table to one of the public cloud and the private cloud, the portion of the table being selected for replication based on the permissions that define user access to specific rows or columns of the table, wherein the data comprises general data, sensitive data and common data, at least one of the general data, the sensitive data, and the common data being encrypted using a different strength encryption than another one of the general data, the sensitive data, and the common data, wherein the sensitive data is replicated to the private cloud based on the metadata, and wherein the common data and the general data are replicated to the public cloud based on the metadata, wherein examining metadata associated with the data includes examining the permissions that define user access to specific rows or columns of the table, the permissions being specified in an Access Control List (ACL) and wherein changing the ACL automatically changes data that is stored in at least one of the private cloud and the public cloud.

12. The system of claim 11, wherein at least one of the private cloud and the public cloud is part of a big data storage cloud.

13. The system of claim 11, wherein the metadata associated with the data on the storage system indicates an age of the data.

14. The system of claim 11, wherein each of the public cloud and the private cloud is associated with a respective security level, and the replication of the data to the public cloud and the private cloud is performed based on the respective security levels of the public cloud and the private cloud.

15. The system of claim 11, wherein at least one of the public cloud and the private cloud is selected to receive the portion of the table based on the metadata.

* * * * *